Patented Dec. 17, 1935

2,024,925

UNITED STATES PATENT OFFICE 2,024,925

PROCESS FOR PREPARING XANTHATES

Wilhelm Hirschkind, Berkeley, Calif., assignor to Great Western Electro-Chemical Company, a corporation of California No Drawing. Application September 14, 1934, Serial No. 744,014

8 Claims. (Cl. 260—99.11)

This invention relates to the manufacture of those derivatives of a dithiocarbonic acid, thioncarbon thiol acid,

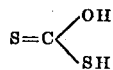

known as "xanthates", and to certain new xanthate products. By utilization of the method of the present invention, xanthates of such an initial high purity can be produced that purification is wholly unnecessary and the products are acceptable commercially. Coupled with high purity is the factor of high yield since the end product is not contaminated and is practically all xanthate. Under prior art processes, yields have been relatively low. For example, in the case of sodium ethyl xanthate a yield of 80% of the theoretical represented the best commercially attainable yield in one commercial plant. By means of the present invention, yields of over 90% of practically pure xanthates are secured.

Xanthates are usually made by treating an alcohol to form a metal alcoholate and then reacting the alcoholate with carbon bisulphide. I have discovered that if the reaction of the alcoholate and bisulphide is conducted under such conditions that the reaction occurs in a non-aqueous medium, the aforementioned high yields and purity can be attained.

Heretofore the best yields and purity have been attained only by maintaining the aqueous reaction mass of alcoholate and bisulphide relatively cool, usually about 30° C., and even then the yields and purity were relatively low. In the case of alcohols such as tertiary butyl alcohol, fenchyl alcohol, borneol and terpineol, a low temperature can not be used without sacrificing rapidity of reaction and the yield and purity suffer.

As an explanation I now adhere to the theory that with the reaction occurring in a non-aqueous medium, hydrolysis of the bisulphide alcoholate and xanthate is prevented so that the undesirable side reaction products are not formed. These products are undesirable as they apparently accelerate decomposition of the xanthate upon storage.

I have also observed that the high yields and purity are secured even though the xanthation temperature is high, over 50° C., 80° C., and even higher. This is an obvious advantage as all cooling is eliminated while the product is substantially pure.

The invention is also concerned with the production of certain new xanthates not known heretofore and which will hereinafter be set forth.

The invention is also concerned with the utilization of certain xanthates as flotation agents, in vulcanization, and as insecticides.

The invention is also concerned with the production of stable xanthates as well as with other matters which will appear in the following.

In the case of forming the alcoholate in an initial anhydrous state and thereafter reacting the anhydrous alcoholate, I proceed as follows:

The anhydrous alcoholate, or substantially anhydrous alcoholate, can be derived from any source or in any desired manner. Thus it can be formed by reacting anhydrous alcohol with metallic sodium or potassium, or the anhydrous alcoholate can also be formed by distilling an azeotropic mixture as in the Kyrides U. S. Patent 1,712,830, or by the use of pressure as in the Halbig and Kaufler Patent 1,816,843. After the desired anhydrous alcoholate is formed, the carbon bisulphide is added to form the corresponding xanthates. With an anhydrous alcoholate the temperature can be high and I have formed xanthates successfully at 80° C. and above the boiling point of carbon bisulphide by placing a reflux condenser on the apparatus and returning the carbon bisulphide to the reaction.

To illustrate the invention in detail as successfully practiced, the following specific examples are set forth of the manufacture of xanthates substantially free of any sulphides or thiocarbonates so that a desired xanthate is secured directly and without the necessity of drying and purifying the xanthate. In these, the reaction mass was not cooled and the temperature was permitted to rise far above 35° C. In several instances a temperature of 80° C. was noted.

*Example Number 1*

68 lbs. of anhydrous sodium ethylate prepared by known methods such as the action of metallic sodium and ethyl alcohol, or according to U. S. Patent 1,712,830, was treated in a reaction vessel, provided with a reflux condenser, gradually, but without cooling, with 77 lbs. of carbon bisulphide. On completion of the reaction, there were left 144 lbs. of sodium ethyl xanthate of a purity of over 98%.

*Example Number 2*

74 lbs. of anhydrous secondary butyl alcohol were reacted with metallic sodium to form the sodium alcoholate. Thereafter 76 lbs. of carbon bisulphide were added to form sodium secondary butyl xanthate. The final mass contained 172 lbs. of the xanthate, a yield of over 99% with corresponding purity.

*Example Number 3*

74 lbs. of anhydrous tertiary butyl alcohol were reacted with metallic sodium to form the alcoholate. Upon addition of the bisulphide, the xanthate of this alcoholate was formed.

In a similar manner the alcoholate of any other alcohol, primary, secondary, or tertiary, monohydric, dihydric, or polyhydric, saturated, or unsaturated, substituted, or unsubstituted, aliphatic, or cyclic (carbocyclic or heterocyclic) can be made with other alkali metals or alkaline earths as well as other metals. The alcoholate can then be reacted with the bisulphide to form the xanthate. In fact any organic compound can be used which contain a hydroxyl in which the hydrogen is replaceable with a metal so as, in effect, to form an alcoholate which will react with $CS_2$ as in the typical xanthation reaction.

The alcoholate can be made under aqueous conditions so that it contains water. Thus when a hydroxide is reacted with an alcohol, water is formed even though the reactants are initially anhydrous as in Missbach Patent 1,591,723 of July 6, 1926, as shown by the following equation:
$C_6H_{13}OH + KOH \rightarrow C_6H_{13}OK + H_2O$.

According to this invention, the water formed upon manufacture of the alcoholate or present in the alcohol is prevented from affecting the alcoholate-carbon bisulphide reaction so that the temperature can be above that to which the process has heretofore been restricted, and I am able to form substantially pure xanthates without cooling and at high temperatures heretofore deemed impractical. The removal of the water as an available reactant or constituent is accomplished either by forming an initially anhydrous alcoholate or by actual physical removal of the water from the alcoholate as by distilling an azeotropic mixture as in the U. S. Patent 1,712,830, or by the use of a dehydrating agent which takes up the water and removes it, or by the use of some condition which otherwise affects the water so that it is not an availble free constituent in the alcoholate at the time the carbon bisulfide is reacted with the alcoholate. The term "anhydrous alcoholate" is used as including the aforementioned alcoholates produced by the conditions outlined. I have successfully added a dehydrator to the hydroxide-alcohol mixture to take up the water as fast as formed and anhydrous $Na_2SO_4$, $Na_2CO_3$, $CaO$, $CaSO_4$, and $Na_3PO_4$ has been used successfully. The hydrate and unused dehydrator, if any, can be left in the alcoholate and the xanthate subsequently leached from the hydrate with a solvent, the hydrate being left behind in both instances. A dehydrator should be chosen which does not lose water either partially or wholly, under the conditions of the reaction.

In the following examples I have disclosed several processes as examples of how my invention has been successfully carried out. These examples are illustrative only and are not to be taken as limiting the invention. As leaching equipment, a Soxhlet extractor, an elutriator or other suitable means can be employed. (All examples are illustrative only and are not limitations.)

*Example Number 4*

46 lbs. of absolute ethyl alcohol, 62.4 lbs. of 90% caustic potash, and 80 lbs. of burned lime were agitated together for two hours in a jacketed mixer, at a temperature of approximately 75° C. The reaction mixture was then leached with 150 gallons of benzol at a temperature of 50° C., the benzol being added in four successive portions. 77 lbs. of 99% carbon bisulphide was added to the benzol-alcoholate solution with agitation. The resulting xanthate was freed from benzol by heating in a jacketed kettle with agitation and the benzol was recovered. The yield was over 90% of 98% potassium ethyl xanthate.

*Example Number 5*

89.8 lbs. of 98% diethyl carbinol, 62.4 lbs. of 90% caustic potash, and 80 lbs. of burned lime were agitated together for two hours in a jacketed mixer, at a temperature of approximately 75° C. The reaction mixture was then leached with 150 gallons of benzol at a temperature of 50° C., the benzol being added in four successive portions. 77 lbs. of 99% carbon bisulphide was added to the benzol-alcoholate solution with agitation. The resulting xanthate was freed from benzol by heating in a jacketed kettle with agitation, the benzol being recovered. The yield was over 90% of 97% potassium xanthate.

*Example Number 6*

75.5 lbs. of 98% butanol, 62.4 lbs. of 90% caustic potash, and 80 lbs. of burned lime were agitated together for two hours in a jacketed mixer, at a temperature of approximately 75° C. The reaction mixture was then leached with approximately 100 gallons of benzol in a Soxhlet extraction apparatus. 77 lbs. of 99% carbon bisulphide was added to the benzol-alcoholate solution with agitation. The resulting xanthate was freed from benzol by heating in a jacketed kettle with agitation. The benzol was recovered. The yield was over 90% of 98% potassium butyl xanthate.

*Example Number 7*

51 lbs. of 95% ethyl alcohol, 80 lbs. of burned lime, and 42.5 lbs. of ground caustic soda were agitated together for two hours at a temperature of about 75° C., in a jacketed mixer. The resulting mixture was leached with toluol to remove the alcoholate. The toluol-alcoholate mixture was then reacted with carbon bisulphide, 77 lbs. being added. The resulting xanthate was freed from the toluol by heating and condensing the toluol, the xanthate yield amounting to over 90% of 98% sodium ethyl xanthate.

If it is desired that a xanthate be stable over a long period a dessicant material can be added in an amount in excess of that required to render the xanthate anhydrous. Thus, to an xanthate containing 20% water, enough of a dessicant, as herein set forth, should be added to take up the water and leave an unhydrated remainder. Or an anhydrous xanthate can have a dessicant added. Instead of adding a dessicant to the alcoholate or otherwise dehydrating the alcoholate, a material can be added to the alcoholate which depresses the degree of hydrolysis of the water present.

This invention contemplates the manufacture of xanthates from any alcohol or other material which can be used to form an alcoholate. Thus it is concerned with the production of xanthates from normal monohydric saturated alcohols and their isomers, methyl, ethyl, the two propyls, the four butyls, the seven amyls, as well as all higher alcohols of this series and their isomers.

The xanthates of so-called fatty alcohols, saturated and unsaturated, (usually $C_nH_{2n+1}OH$) are included. As such alcohols I mention lauryl, octadecyl, oleyl, cetyl, ceryl, and myricyl.

The new xanthates of monohydric unsaturated alcohols, the alcohols derived from acetylene, and which include propargyl alcohol, are also included.

The new xanthates of monohydric, unsaturated alcohols, $C_nH_{2n-1}OH$ are also included. These include the xanthates of vinyl and allyl alcohols.

The new xanthates of open chain olefinic terpenes, nerol, geraniol, and linalool, are also included.

The xanthates of monocyclic terpenes and camphors, terpin compounds, as well as those of complex cyclic terpenes and camphors as fenchyl alcohol, borneol, and terpineol, are included.

The new xanthates, those made from hydroxy compounds are also contemplated. These include hydroxylamines presently discussed.

Xanthates of dihydric and other polyhydric alcohols are also contemplated. These include diprimary, primary secondary, di-secondary, primary tertiary, secondary tertiary, and di-tertiary glycols, and specifically ethylene, the propylene, the butylene, the amylene, and hexalene glycols as well as tetra methyl-ethylene glycol are mentioned.

The xanthates of derivatives of the glycols, wherein one of the hydroxyls has been replaced, are included. These include xanthates of gylcol chlorhydrin, hydroxylethylamine and isethionic acid, respectively set forth as a mineral acid ester, an amine and a sulphurous acid derivative.

Other polyhydric alcohols can be used, and derivatives thereof, as glycerol and derivatives thereof containing one or more hydroxyls as the mono and dichlorhydrins, glycide alcohol and derivatives thereof. Tetra-, penta-, and hexahydric alcohols and derivatives can be used as xanthate sources and such alcohols are erythritol, arabitol, mannitol, sorbitol and dulcitol.

From hydroxy compounds many new xanthates have been made and the monohydroxy derivatives of the fatty acids as glycollic acid are mentioned as examples although all others are included as well as acid derivatives as sodium glycollate, ethyl glycollate, glycollyl chloride and glycollamide. Polyhydric monobasic acids as glyceric, arabonic, gluconic, mannonic, gulonic, galactonic, and talonic acids can be operated upon to form xanthates. Hydroxyl aldehydes, aldol, and glyceric aldehyde, can be used to form corresponding xanthates as can the dihydroxy dibasic acids, the tartaric acids, and polyhydroxy dibasic acids, trihydroxy glutaric acid and the saccharic acids. Hydroxy polybasic acids, citric acid, and derivatives provide xanthate sources.

Hydroxylic derivatives of benzene and its homologues are included. Thus, starting with a monohydric phenol wherein the hydroxyl is attached to the nucleus as phenol, a cresol, a xylenol, or a higher monohydric phenol, or a homologue having a modified or substituted side chain, many varied and different xanthates are made.

Polyhydric phenols, dihydroxy phenols as catechol and resorcinol, trihydroxy phenols as pyrogallol, phloroglucinol, hydroxy-quinol, are other sources of xanthates.

Aromatic alcohols, those in which the hydroxyl is in the side chain, are also useful herein, both saturated and unsaturated, substituted and un-substituted. Benzyl alcohol, phenyl ethyl alcohol, phenyl methyl carbinol and cinnamic alcohol are mentioned as examples.

Hydroxy or phenolic alcohols and aldehydes, such as o-hydroxy benzyl alcohol, anisyl alcohol, vanillyl alcohol, coniferyl alcohol, o-hydroxy benzaldehyde, 3,4 dihydroxy-benzaldehyde, and vanillin. Quinones, quinone monoxime, and dioxime, are useful as xanthate sources.

Aromatic acids containing an OH group as the sulpho- and hydroxy saturated and unsaturated acids are useful as the sulpho-benzoic acids, hydroxy salicyclic, the hydroxy benzoic acids, mandelic acid, tropic acid, and polyhydroxy-phenolic acids as protocatechuic acid. Hydroxy polybasic acids as 2,5 dihydroxy-terephthalic and succinylo-succinic acids are also useful.

Aromatic compounds containing two or more benzene nuclei and having one or more hydroxyls are included. As examples are mentioned benzidine sulphonic acids as benzidine monosulphonic acid and benzidine disulphonic acid, hydroxydiphenyls as the dihydroxy diphenyls. Diphenyl methane derivatives as benzhydrol and diphenyl glycollic acid are included.

Derivatives of dibenzyl, the hydrobenzoins, benzoin, and benzilic acid are included.

Derivatives of triphenyl methane are included as trinitro-triphenyl carbinol, tri-phenyl carbinol, para-rosaniline and trihydroxy tri-phenyl-methanes, the aurines.

Compounds derived from condensed benzene nuclei, as naphthalene and anthracene, are included, those which contain one or more hydroxyls or are derivatives of sulphurous acid. The two naphthols and the naphthalene sulfonic acids, and derivatives and substitution products of these as amino naphthols and amino naphthol sulfonic acid, hydroxy naphthoic acids, as hydroxy naphthoic acid, hydroxy anthracenes, sulphonic acids of anthracene, the several isomeric hydroxy-anthraquinones including quinizarine, etcetera, are useful, as are like phenanthrenes as phenanthrol and phenanthrenequinol.

Under heterocyclic compounds are mentioned the alcohols of the furanes, thiophene, furane and pyrrole, and derivatives thereof as hydroxy thiotolene as well as hydroxy compounds formed by condensation of a benzene nucleus with a furane, thiophene or pyrrole ring as coumarone, benzothiophene and indole and derivatives and substituted compounds thereof.

Suitable hydroxy containing members of the pyrazole and thiozole groups and sulfonated members thereof can be used.

Pyridine and its homologues provide sources of suitable hydroxy compounds, the hydroxy pyridines and of which pyridine itself forms three. Similarly, hydroxy compounds broadly considered as formed by condensation of a benzene nucleus and a heterocyclic six membered ring such as 3-hydroxy flavone, chrysin, luteolin, quercitin, myricetin, rhamnetin, and rhamnazin. Quinolines as 1-hydroxy quinoline and other hydroxyl containing condensed benzene-pyridine nuclei are useful.

In forming alcoholates of polyhydric materials, more than one OH group, the extent of alcoholate formation can be controlled so that the material is only in part an alcoholate, that is, only one or more of the available OH groups are acted upon by the alcoholate, and the xanthate possesses in part its character as an hydroxyl material. Thus, in forming a xanthate from ethylene glycol, incomplete reaction with sodium results in formation of mono sodium ethylene glycolate, only one of the two OH groups being reacted, the other remaining, so that xanthation of the mono sodium glycolate results in a xanthate having an OH group remaining.

I have previously stated that any organic compound can be used which contains an hydroxyl in which the hydrogen is replaceable with a metal so as, in effect, to form an alcoholate, observation being made, and care taken, of course, to avoid hydrolysis of the starting material or the alcoholate formed. The presence of an OH group within which the H is replaceable with a metal (Na, K, Ca, Mg and Al) is characteristic of an alcohol.

As has been mentioned before, hydroxy acids can be used to form xanthates. Among the monobasic hydroxy acids, the various and several lactic acids and glycollic acid are mentioned as the most important. Acid derivatives, alcoholic derivatives and mixed derivatives of hydroxy monobasic acids, are useful as sodium glycollate, disodium glycollate, sodium ethyl glycolate, sodium glycollic chloride and sodium glycollamide are mentioned as sodium derivatives. Derivatives of the several lactic acids can be used as sodium and disodium lactate.

Alkali solutions of lactones, really alkali salts of the corresponding hydroxy acids, are sources of xanthates, upon reaction with bisulphide.

Polyhydric monobasic acids including di-, tetra- and pentahydroxy monobasic acids as glyceric acid can be used to form various alcoholates which, upon addition of carbon bisulfide, form xanthates.

In forming some xanthates, it is desirable that the alcoholate be formed under anhydrous conditions and with the metal as sodium or potassium. This is necessary to avoid hydrolysis, side reactions or other reactions either preventing alcoholate formation or reducing the purity of the alcoholate. Thus in forming the xanthates of glycol monochlorhydrins, the alcoholate is formed by treating the anhydrous chlorohydrin with sodium or potassium metal and thus avoiding elimination of HCl and formation of cyclic anhydrides as ethylene oxide.

Xanthates can also be formed from the ethers by converting the ether into the alcohol. Thus I have heated ethyl ether, for example, with water under pressure, preferably in the presence of a small amount of sulphuric acid, to form ethyl alcohol which was then reacted in the usual manner to form an alcoholate. Ethers corresponding to the secondary alcohols are split even more readily. Any ether can be used whether aliphatic or cyclic, (carbocyclic or heterocyclic) saturated or unsaturated, substituted or unsubstituted, which upon hydrolysis yields an alcohol.

The alcoholate need not be formed from an OH containing compound as an alcohol isolated as such. For instance, in the discussion of the manufacture from ethers, the corresponding alcohol is not isolated, although it can be. So also with such materials as ethyl hydrogen sulphate, hydrolysis upon boiling with NaOH results in the formation of sodium alcoholate and sodium sulphate which dehydrates the alcoholate. In the manufacture of alcohols today, it is common practice to absorb a refinery still gas in a mineral acid, usually an olefin in sulphuric acid, and then hydrolyze to form an alcohol, or mixture of alcohols, and regenerate the acid. The acid absorption liquor containing the olefin can be hydrolyzed in the presence of alkali, to form the desired alcoholate.

The metal alcoholates are usually those forming water soluble xanthates, particularly those of the alkali metals, including ammonia, through the alkaline earths as well as those of nickel, cobalt and iron are included. Xanthates of heavy metals (lead, zinc, iron, etcetera) are usually not as water soluble as those of sodium and potassium and they can be made by addition of a soluble salt of the metal to a sodium or potassium xanthate solution, for example.

The foregoing xanthates are useful in flotation, usually quantities of the order of 0.1 to 0.2 pound of xanthate to a ton of material being required, with or without a frothing agent as pine oil, terpineol, cresylic acid or the like. The pulp is subjected to an aeration or froth flotation operation producing a froth carrying the mineral, for example, from the ore. High percentages of recovery are usual although as is well known, different xanthates and different types of circuits are required for different types and grades of ores and for different ores.

In vulcanization the xanthates, usually a heavy metal xanthate such as zinc, is added to a mixture of the rubber and other materials as sulphur and zinc oxide, or with an amine as formine or aniline, and sulphur. Subjection to heat results in the rubber vulcanizing rapidly.

This application is filed to combine certain prior applications to which I am a party and as a continuation in part thereof, particularly Serial Numbers 619,272, 603,890 and 675,103.

I claim:

1. A xanthation process comprising reacting together carbon bisulphide and an anhydrous alkali metal alcoholate in substantially molecular proportions and in such quantities that the heat of reaction raises the temperature of the reacting bisulphide, alcoholate and the resulting xanthate so that the reaction proceeds at a high rate without requiring external heating to produce as a direct product of the reaction a stable, dry and pure xanthate free of any water, side reaction products, unreacted constituents and mother liquor.

2. A xanthation process comprising reacting together carbon bisulphide and an anhydrous alkali metal alcoholate in substantially molecular proportions and in such quantities that the heat of reaction raises the temperature of the reacting bisulphide, alcoholate and the resulting xanthate so that the reaction rate is rapid and unaffected by external heat conditions to produce as a direct product of the reaction a stable, dry and pure xanthate free of any water, side reaction products, unreacted constituents and mother liquor.

3. The process of claim 1 in which the alcoholate is that of a secondary alcohol.

4. The process of claim 1 in which the alcoholate is that of a tertiary alcohol.

5. The process of claim 1 in which the alcoholate is that of a dihydric alcohol.

6. The process of claim 2 in which the alcoholate is that of a secondary alcohol.

7. The process of claim 2 in which the alcoholate is that of a tertiary alcohol.

8. The process of claim 2 in which the alcoholate is that of a dyhydric alcohol.

WILHELM HIRSCHKIND.